United States Patent [19]

Miyamori et al.

[11] Patent Number: 5,330,830
[45] Date of Patent: Jul. 19, 1994

[54] HEAT-RESISTING POROUS MEMBRANE, HYDROPHILIZED HEAT-RESISTING POROUS MEMBRANE AND PRODUCTION PROCESSES THEREOF

[75] Inventors: Takao Miyamori; Kazuaki Hayashida; Jun Kamo, all of Otake, Japan

[73] Assignee: Mitsubishi Rayon Co., Ltd., Tokyo, Japan

[21] Appl. No.: 868,135

[22] Filed: Apr. 14, 1992

[51] Int. Cl.$^5$ .................. B32B 3/26; B29C 65/00; C08F 4/00; B01D 33/21
[52] U.S. Cl. .................. 428/304.4; 264/41; 264/45.1; 264/45.5; 525/243; 210/500.23; 210/500.35
[58] Field of Search ............ 264/41, 45.1, 45.5; 428/304.4; 525/243; 210/500.23, 500.35

[56] References Cited

U.S. PATENT DOCUMENTS

| | | | |
|---|---|---|---|
| 4,919,865 | 4/1990 | Nelson | 264/45.1 |
| 4,961,853 | 10/1990 | Itoh et al. | 264/45.1 |

FOREIGN PATENT DOCUMENTS

| | | |
|---|---|---|
| 0186758 | 7/1986 | European Pat. Off. . |
| 1125408 | 6/1986 | Japan . |
| 3069673 | 3/1991 | Japan . |

*Primary Examiner*—George F. Lesmes
*Assistant Examiner*—Kathryne E. Shelbourne
*Attorney, Agent, or Firm*—Oblon, Spivak, McClelland, Maier & Neustadt

[57] ABSTRACT

A heat-resisting porous membrane comprises a porous polyolefin membrane having a crosslinked copolymer held on at least a part of the pore surfaces thereof, the crosslinked copolymer being composed of a monomer (A) comprising at least one multifunctional (meth)acrylate and a monomer (B) comprising at least one monofunctional (meth)acrylate having a hydrocarbon radical of 5 to 20 carbon atoms; and the heat-resisting porous membrane can be hydrophilized by additionally having a crosslinked polymer thereon. These heat-resisting porous membranes can be used in hot water for a long period of time without deteriorating the mechanical properties inherently possessed by the matrix of the porous membrane.

9 Claims, No Drawings

HEAT-RESISTING POROUS MEMBRANE, HYDROPHILIZED HEAT-RESISTING POROUS MEMBRANE AND PRODUCTION PROCESSES THEREOF

BACKGROUND OF THE INVENTION

1. Field of the Invention

This invention relates to porous polyolefin membranes suitable for use in precision filtration and having excellent heat resistance; porous polyolefin membranes suitable for use in precision filtration and having both excellent heat resistance and hydrophilicity; and processes for the production of such membranes.

2. Description of the Prior Art

In recent years, a variety of separating membranes have come to be used in various fields such as water purification, blood treatment, air cleaning and food industry. For example, precision filtering membranes formed of a polyolefin such as polyethylene are being widely used to easily obtain highly pure water and highly clean air, because they have excellent chemical resistance and excellent physical properties such as strength, elongation and flexibility. As the range of use of precision filtering membranes extends, it is more strongly desired to use them at elevated temperatures, for example, of the order of 80° to 95° C.

Moreover, in many applications (such as food industry and blood treatment) of precision filtering membranes, their contamination with microorganisms such as bacteria and molds is not permitted and, therefore, they are sterilized prior to use. Useful sterilizing processes include treatment with chemicals such as ethylene oxide, formalin and hydrogen peroxide, exposure to radiation such as gamma rays, and heat treatment such as steam heating. Among them, steam heating is most preferred so long as the precision filtering membrane being treated can withstand it, because it is an effective and simple process involving little risk of contamination with impurities during the sterilization step. Usually, steam heating comprises treatment with steam at 121° C. for 30 minutes.

However, porous membranes formed of polyolefins such as polyethylene tend to undergo marked heat shrinkage and morphological changes, when they are continuously used at an elevated temperature of 80° to 95° C. or sterilized by steam heating comprising treatment with steam at 121° C. for 30 minutes. This often causes a sharp reduction in water or air permeability and impairs their function as precision filtering membranes.

Moreover, since porous polyolefin membranes are hydrophobic, water cannot permeate therethrough when they are used as such. Accordingly, where it is desired to utilize them for the treatment of aqueous liquids (i.e., water and water-based solutions), they need to be hydrophilized in advance by means of a hydrophilizing agent such as an alcohol or the like. However, porous polyolefin membranes hydrophilized with an alcohol or the like have the disadvantage that, once they are dried, their hydrophilicity is lost.

In an attempt to overcome the above-described disadvantages of porous membranes formed of polyolefins, Japanese Patent Laid-Open No. 33878/'87 has proposed a technique for improving the heat resistance of porous polyolefin membranes. This technique comprises forming a heat-resisting polymer film having a crosslinked structure on the surfaces of polyolefin hollow fiber membranes.

Moreover, a number of techniques for imparting hydrophilicity to porous polyolefin membranes have also been proposed. Specifically, Japanese Patent Laid-Open No. 57836/'81 discloses porous polyethylene membranes which have been rendered hydrophilic by the introduction of sulfonic acid groups; Japanese Patent Laid-Open No. 271003/'86 discloses porous polyolefin membranes which have been rendered hydrophilic by causing membranes to hold an ethylene-vinyl alcohol copolymer on their surfaces, Japanese Patent Laid-Open No. 125408/'86 discloses porous polyethylene hollow fiber membranes which have been rendered hydrophilic by causing the membranes to hold an ethylene-vinyl acetate copolymer on their surfaces and then saponifying it.

Furthermore, as a technique for imparting both heat resistance and hydrophilicity simultaneously to porous polyolefin membranes, Japanese Patent Laid-Open No. 59030/'90 has proposed a method which comprises causing the membranes to hold a crosslinked polymer composed of a styrene monomer and divinylbenzene on their surfaces and then polymerizing a hydrophilic monomer (such as diacetone acrylamide) and a crosslinkable monomer thereon to form a hydrophilic copolymer. In addition, Japanese Patent Laid-Open No. 69673/'91 discloses a method which comprises thermally polymerizing a mono- or di(meth)acrylate of polyethylene glycol and a multifunctional (meth)acrylate on the pore surfaces of a porous polyolefin membrane to bond the resulting copolymer firmly thereto.

However, in the method proposed by Japanese Patent Laid-Open No. 33878/'87, it has been found that the heat resistance of porous membranes is improved temporarily, but some physical properties (such as elongation at break and breaking strength) inherently possessed by the porous membranes are deteriorated while they are immersed in hot water for a long period of time.

In the method for imparting both heat resistance and hydrophilicity as described in Japanese Patent Laid-Open No. 59030/'90, the heat resistance of porous polyolefin membranes is improved owing to the use of a crosslinked polymer derived from aromatic monomers, but the resulting membranes have some disadvantages. Specifically, the crosslinked polymer tends to be so rigid that the flexibility inherently possessed by hollow fiber membranes may be impaired. Moreover, when the membranes are immersed in hot water for a long period of time, their mechanical properties such as elongation at break are reduced, probably because of the relatively poor affinity between the crosslinked polymer and the material forming the membranes per se.

In the method described in Japanese Patent Laid-Open No. 69673/'91, the resulting membranes have been found to have the disadvantage that, probably because the monomers to be copolymerized have high molecular weights and are hence bulky hydrophilic monomers, the adhesion of the copolymer to the polyolefin hollow fiber membrane matrix is not satisfactorily good, and the heat resistance of the membranes cannot be maintained for a long period of time when they are immersed in hot water. Thus, a technique for imparting both heat resistance and hydrophilicity which can withstand long-time use also in hot water having a temperature of about 90° C. has not been known in the prior art.

SUMMARY OF THE INVENTION

It is an object of the present invention to provide a heat-resisting porous polyolefin membrane which can be used in hot water for a long period of time without deteriorating the mechanical properties inherently possessed by the membrane matrix, and a process for the production of such a membrane.

It is another object of the present invention to provide a porous polyolefin membrane having hydrophilicity which makes it suitable for use in the treatment of aqueous liquids and heat resistance which enables it to be used in hot water for a long period of time, and a process for the production of such a membrane.

According to one aspect of the present invention, there is provided a heat-resisting porous membrane comprising a polyolefin porous membrane having a crosslinked copolymer held on at least a part of the pore surfaces thereof, the crosslinked copolymer being composed of a monomer (A) comprising at least one multifunctional (meth)acrylate and a monomer (B) comprising at least one monofunctional (meth)acrylate having a hydrocarbon radical of 5 to 20 carbon atoms.

According to another aspect of the present invention, there is provided a hydrophilized heat-resisting porous membrane comprising a polyolefin porous membrane having a crosslinked copolymer held on at least a part of the pore surfaces thereof and additionally having a hydrophilic polymer held on the crosslinked copolymer, the crosslinked copolymer being composed of a monomer (A) comprising at least one multifunctional (meth)acrylate and a monomer (B) comprising at least one monofunctional (meth)acrylate having a hydrocarbon radical of 5 to 20 carbon atoms.

According to still another aspect of the present invention, there is provided a process for the production of a heat-resisting porous membrane which comprises the step of copolymerizing a monomer (A) comprising at least one multifunctional (meth)acrylate and a monomer (B) comprising at least one monofunctional (meth)acrylate having a hydrocarbon radical of 5 to 20 carbon atoms, on at least a part of the pore surfaces of a polyolefin porous membrane to form a crosslinked copolymer on the pore surfaces.

According to a further aspect of the present invention, there is provided a process for the production of a hydrophilized heat-resisting porous membrane which comprises the steps of copolymerizing a monomer (A) comprising at least one multifunctional (meth)acrylate and a monomer (B) comprising at least one monofunctional (meth)acrylate having a hydrocarbon radical of 5 to 20 carbon atoms, on at least a part of the pore surfaces of a polyolefin porous membrane to form a crosslinked copolymer on the pore surfaces; and forming a hydrophilic polymer on at least a part of the pore surfaces and the crosslinked polymer held on the pore surfaces.

DETAILED DESCRIPTION OF THE PREFERRED EMBODIMENTS

The polyolefin material forming the porous polyolefin membranes used in the present invention can be a polisher or copolymer composed principally of one or more monomers selected from the group consisting of ethylene, propylene, 4-methyl-1-pentene and 3-methyl-1-butene, or a fluorinated product thereof.

The porous polyolefin membranes may be in any form such as hollow fiber membranes, planar membranes or tubular membranes. However, hollow fiber membranes are preferably used because they can maximize the membrane area per unit volume. Although porous membranes having various structures can be used according to the intended purpose, preferred examples thereof are ones having a membrane thickness of about 20 to 200 $\mu$m, a porosity of about 20 to 90%, a water permeability of 0.001 to 50 l/m$^2$·hr·mmHg as measured by the alcohol-dependent hydrophilizing method, and a pore diameter of about 0.01 to 5 $\mu$m.

As the starting porous membrane serving as the matrix, there can be used porous membranes having pore structures formed by various methods. They include, for example, porous membrane having a porous structure formed by melt-forming a polyolefin material and then stretching the resulting membrane, and porous membranes having a porous structure formed by melt-forming a mixture of a polyolefin material and a substance soluble in water or other solvent (such as an inorganic substance or a low-molecular-weight ester compound) and then leaching out the soluble substance. Among them, porous membranes having a porous structure formed by melt forming and subsequent stretching are preferably used because they have high porosity and are less liable to performance losses due to plugging.

Such porous membranes having a porous structure formed by melt forming and subsequent stretching are ones having a pore structure in which minute slit-like spacings (pores) formed by microfibrils and joint portions communicate three-dimensionally with each other. Such porous membranes can be produced, for example, by the processes disclosed in Japanese Patent Publication No. 52123/'81 (U.S. Pat. No. 4,055,696) and Japanese Patent Publication No. 42006/'88 (U.S. Pat. No. 4,401,567).

As the above-defined porous polyolefin membranes, there can be used all types of porous polyethylene and polypropylene hollow fiber membranes manufactured by Mitsubishi Rayon Co., Ltd.

The crosslinked copolymer held on the pore surfaces is a crosslinked copolymer composed of a monomer (A) comprising at least one multifunctional (Meth)acrylate (hereinafter referred to briefly as the crosslinkable monomer (A)) and a monomer (B) comprising at least one monofunctional (meth)acrylate having a hydrocarbon radical of 5 to 20 carbon atoms (hereinafter referred to briefly as the vinyl monomer (B)). Specific examples of the crosslinkable monomer (A) include dimethacrylates such as ethylene glycol dimethacrylate, 1,3-butylene glycol dimethacrylate, glycerol dimethacrylate, 1,6-hexanediol dimethacrylate and 1,4-butylenediol dimethacrylate; trimethacrylates such as trimethylolpropane trimethacrylate and pentaerythritol trimethacrylate; tetramethacrylates such as pentaerythritol tetramethacrylate; diacrylates such as ethylene glycol diacrylate and 1,6-hexanediol diacrylate; and triacrylates such as trimethylolpropane triacrylate. Among them, dimethacrylates and trimethacrylates are preferred. As the crosslinkable monomer (A), the foregoing monomers may be used alone or in admixture of two or more.

As the vinyl monomer (B), monofunctional (meth)acrylates having a hydrocarbon radical of 5 to 20 carbon atoms are used because of their little irritation to the skin, their good copolymerizability with crosslinkable monomers (A), their good penetrability into porous polyolefin membranes, and their ease of in-situ polymerization. Preferred examples of the hydrocarbon radical of 5 to 20 carbon atoms include alkyl groups of 5 to 20 carbon atoms, aralkyl groups of 7 to 20 carbon atoms, and aryl groups of 6 to 20 carbon atoms. Monofunctional (meth)acrylates in which the hydrocarbon radical is an alkyl group include, for example, methacrylic esters such as cyclohexyl methacrylate, lauryl methacrylate, tridecyl methacrylate, stearyl methacrylate and 2-ethylhexyl methacrylate; and acrylic esters such as 2-ethylhexyl acrylate, cyclohexyl acrylate and stearyl acrylate. Monofunctional (meth)acrylates in which the hydrocarbon radical is an aralkyl group include, for example, benzyl methacrylate and benzyl acrylate. Monofunctional (meth)acrylates in which the hydrocarbon radical is an aryl group include, for example, phenyl methacrylate. Among them, monofunctional methacrylates in which the hydrocarbon radical is an alkyl group of 5 to 20 carbon atoms are preferred because their very little irritation to the skin and their relatively high boiling points and ease of handling. It is more preferable to use a monofunctional methacrylate having an alkyl group of 10 to 18 carbon atoms as one of the monomers for the formation of a crosslinked copolymer, because such a monofunctional methacrylate functions as an internal plasticizer and the resulting crosslinked copolymer hence has such flexibility as to provide good adhesion to the porous polyolefin membrane serving as the matrix. The vinyl monomer (B) may comprise either a single monomer or a mixture of two or more monomers.

In order to improve the heat resistance of the heat-resisting porous membranes of the present invention, and in order to decrease heat shrinkage in hot water especially where the matrix comprises a porous polyethylene membrane, it is preferable that the proportion of the crosslinkable monomer (A) in the crosslinked copolymer formed from the crosslinked monomer (A) and the vinyl monomer (B) be high. On the other hand, in order to maintain some physical properties (such as elongation at break and breaking strength) in hot water for a long period of time, it is preferable that the proportion of the crosslinkable monomer (A) be low. From this point of view, the proportion of the crosslinkable monomer (A) should preferably be within the range of 10 to 90% by weight and more preferably within the range of 30 to 80% by weight.

No particular limitation is placed on the manner of combination of the crosslinkable monomer (A) and the vinyl monomer (B), so long as each of them falls within the above-described range. For example, when 1,6-hexanediol dimethacrylate is used as the crosslinkable monomer (A) and lauryl methacrylate is used as the vinyl monomer (B), there can be obtained a hydrophilized heat-resisting porous membrane which shows little heat shrinkage when immersed in hot water for a long period of time and which does not undergo a significant change of elongation at break with time.

Although the amount of crosslinked copolymer held on the pore surfaces of the porous membrane may vary according to the type of crosslinkable monomer, the porosity and pore diameter of the porous membrane, and the like, it is preferably within the range of about 5 to 50% by weight based on the weight of the porous membrane. If the amount of crosslinked copolymer held is less than the aforesaid lower limit, it is difficult to impart a sufficient degree of heat resistance to the porous membrane. On the other hand, even if the amount of crosslinked copolymer held is greater than the aforesaid upper limit, the heat resistance of the porous membrane cannot be improved any more. Rather, the volume of the pores tends to decrease and cause a reduction in fluid permeation performance. It is more preferable that the amount of crosslinked copolymer held be within the range of about 20 to 50% by weight.

This crosslinked copolymer should preferably be held on all of the pore surfaces of the porous polyolefin membrane. However, the crosslinked copolymer need not necessarily be held on all of the pore surfaces, provided that the pores are open enough to allow water to permeate therethrough under a commonly employed transmembrane pressure difference and a substantial improvement in heat resistance can be achieved.

The term "held" as used herein means that the crosslinked copolymer is firmly bound or attached to the specified sites to such a degree as not to come off easily during storage or use. The crosslinked copolymer may be chemically bonded to the specified sites, or attached to the specified sites by an anchoring effect. Especially where a porous membrane which has been made porous by the above-described stretching method is used, the copolymer is formed so as to enclose the microfibrils and, therefore, can be firmly held thereon. Accordingly, it is preferable to use a porous membrane which has been made porous by the above-described stretching method.

The hydrophilized heat-resisting porous membranes of the present invention are obtained by additionally forming a hydrophilic polymer on at least a part of the pore surfaces and the crosslinked copolymer held on the pore surfaces of a heat-resisting porous membrane as described above.

As the hydrophilic polymer, there may be used a variety of polymers including, for example, diacetone acrylamide as disclosed in Japanese Patent Laid-Open No. 163703/'87, and a saponification product of an ethylene-vinyl acetate copolymer as disclosed in Japanese Patent Laid-Open Nos. 125408/'86 and 271003/'86. Among others, a saponification product of an ethylene-vinyl acetate copolymer is especially preferred.

The composition of the saponification product of the ethylene-vinyl acetate copolymer may suitably be chosen with consideration for its hydrophilicity-imparting effect and its adhesion to the pore surfaces of the porous polyolefin membrane and the crosslinked copolymer present thereon. However, it is preferable to use a saponification product of an ethylene-vinyl acetate copolymer which has an ethylene content of about 20 to 70 mole % and a degree of saponification of not less than 60 mole %.

The amount of hydrophilic polymer held may be suitably determined with consideration for the hydrophilicity and water permeation performance of the resulting hydrophilized heat-resisting porous membrane.

The term "held" as used herein for the hydrophilic polymer has the same meaning as described above for the crosslinked copolymer, and means that the hydrophilic polymer is firmly bound or attached to the specified sites to such a degree as not to come off easily during storage or use.

Now, the processes for the production of heat-resisting porous membranes and hydrophilized heat-resisting porous membranes in accordance with the present invention will be described hereinbelow. It is to be understood, however, that the porous membranes of the present invention are not limited to those produced by the processes described hereinbelow.

In the process for the production of heat-resisting porous membranes in accordance with the present invention, a crosslinkable monomer (A) and a vinyl monomer (B) are held on the pore surfaces of a porous polyolefin membrane. For this purpose, there may employed a variety of methods. By way of example, a solution is prepared by dissolving those monomers and, if necessary, a polymerization initiator, a polymerization regulator, a stabilizer and the like in a suitable solvent. Then, a starting porous membrane is impregnated with the solution by soaking the porous membrane in the solution or by causing the solution to penetrate into the pores of the porous membrane under pressure. Thereafter, the solvent is removed by evaporation. The use of such a solution makes it possible to cause the monomers to adhere substantially evenly to all of the pore surfaces of the porous membrane without plugging the pores thereof. Moreover, the amounts of the monomers adhering to the pore surfaces of the porous membrane can be controlled by varying the concentrations of the monomers in the solution or the time for which the porous membrane is soaked in the solution.

As the solvent for the preparation of the above-described solution, there may be used any organic solvent that has a lower boiling point than all the monomers, can wet porous polyolefin membranes, and can dissolve the monomers. Where a polymerization initiator and other additives are used, it is preferable to use a solvent which can also dissolve them. Useful organic solvents include alcohols such as methanol, ethanol, 1-propanol and 2-propanol; ketones such as acetone, methyl ethyl ketone and methyl isobutyl ketone; ethers such as tetrahydrofuran and dioxane; ethyl acetate; and chloroform.

No particular limitation is placed on the boiling point of the organic solvent, provided that the abovedescribed relationship with the boiling points of the monomers is maintained. However, its boiling point is preferably below about 100° C. and more preferably below about 80° C., because this facilitates removal of the solvent prior to the polymerization step.

The proportions of the monomers and the solvent in the solution may be suitably determined with consideration for the type of the solvent, the desired amount of crosslinked copolymer held, and other factors. More specifically, the solvent may be used in an amount of about 50 to 10,000 parts by weight, preferably 200 to 5,000 parts by weight, per 100 parts by weight of the combined amount of the crosslinkable monomer (A) and the vinyl monomer (B).

When the porous membrane is subjected to a soaking or penetration treatment using the above-described solution, no particular limitation is placed on the soaking or penetration time. However, it generally ranges from about 0.5 second to about 30 minutes. As the wetting properties of the solution for the porous membrane becomes better, this treatment can be carried out in a shorter period of time.

After the soaking or penetration treatment is completed, any excess solution is removed from the porous membrane and, if necessary, the solvent present in the pores is evaporated. Then, the monomers held in the pores of the porous membrane are polymerized. This polymerization may be effected while the solvent is being removed.

In order to polymerize the monomers, there may be employed any of various polymerization techniques including photopolymerization, radiation polymerization and thermal polymerization using a radical polymerization catalyst. The polymerization initiator can be any of conventional polymerization initiator.

In photopolymerization, ultraviolet or visible light may be used for purposes of irradiation. As ultraviolet light sources, there may be used low-pressure mercury vapor lamps, high-pressure mercury vapor lamps, xenon lamps, arc lamps and the like.

In thermal polymerization, it is desirable that the polymerization temperature be higher than the decomposition temperature of the polymerization initiator added and lower than a temperature at which the membrane structure of the porous membrane is changed and the membrane matrix thereof is damaged. Generally, the thermal polymerization is effected at a temperature of about 30° to 100° C.

If oxygen is present in the atmosphere for polymerization, the polymerization reaction is inhibited. Accordingly, it is desirable to effect the polymerization in a substantially oxygen-free atmosphere, for example, in an atmosphere of an inert gas such as nitrogen.

When the monomers held on the pore surfaces of the porous membrane are polymerized, the resulting copolymer is also crosslinked. Thus, at least a part of the pore surfaces of the porous membrane are covered with a crosslinked copolymer.

After the crosslinked copolymer has been held on the pore surfaces of the porous membrane, it is preferable to remove any undesired matter (such as unreacted monomers and free polymers) present on the pore surfaces and outer surfaces (in the case of a hollow fiber membrane or tubular membrane, inner and outer wall surfaces) of the porous membrane. This can be accomplished by a soaking or penetration treatment using a suitable cleaning solvent, if necessary. The cleaning solvent can be the same as the solvent used to dissolve the crosslinkable monomer (A) and the vinyl monomer (B).

In the process for the production of hydrophilized heat-resisting porous membranes in accordance with the present invention, a crosslinked copolymer is first held on at least a part of the pore surfaces of a starting porous membrane in the same manner as described above for the process for the production of heat-resisting porous membranes, and a hydrophilic polymer is then held on the crosslinked copolymer and that part of the pore surfaces of the porous membrane which is not covered with the crosslinked copolymer. The method of forming the hydrophilic polymer will be described below by using a saponification product of an ethylene-vinyl acetate copolymer as a typical example thereof.

The ethylene-vinyl acetate copolymer used to form the saponification product can be any of various types of copolymers such as random copolymers, block copolymers and graft copolymers. Although the ethylene-vinyl acetate copolymer is basically composed of ethylene and vinyl acetate, other monomer components may also be present in such amounts as not to impair the desired properties.

The content of ethylene units in the ethylene-vinyl acetate copolymer is important in that it affects the adhesion of the ethylene-vinyl acetate copolymer and its saponification product to the crosslinked copolymer and the pore surfaces of the porous membrane and, moreover, it also affects the degree of hydrophilicity imparted to the porous membrane. From these points of view, the content of ethylene units should preferably be within the range of 20 to 70 mole %. With consideration for a better balance between the above-described two properties, it is more preferable that the content of ethylene units be within the range of 25 to 50 mole %. If the content of ethylene units is less than 20 mole %, the ethylene-vinyl acetate copolymer or its saponification product, when deposited on the pore surfaces of the porous membrane, fails to have good adhesion and tends to come off. On the other hand, if the content of ethylene units is greater than 70 mole %, the finally obtained saponification product may fail to impart good hydrophilicity to the porous membrane.

In order to hold a saponification product of an ethylene-vinyl acetate copolymer on the pore surfaces of a heat-resisting porous membrane, the saponification product may be held directly on the pore surfaces of the heat-resisting porous membrane, or the ethylene-vinyl acetate copolymer may be held on the pore surfaces of the heat-resisting porous membrane and then saponified.

Where it is desired to hold the saponification product directly on the pore surfaces of a heat-resisting porous membrane, there may employed (1) a method which comprises introducing a holding solution containing the saponification product into the pores of the heat-resisting porous membrane by soaking, penetration or other technique and then evaporating the solvent of the solution; and (2) a method which comprises introducing a holding solution containing the saponification product into the pores of the heat-resisting porous membrane by soaking, penetration or other technique, dipping the porous membrane in a solution of a coagulant for the saponification product to coagulate it on at least the pore surfaces, and then drying the porous membrane.

The holding solution can be prepared by dissolving the saponification product in a solvent therefor. As the solvent, there may be used a water-miscible organic solvent or a mixture of a water-miscible organic solvent and water. Useful water-miscible organic solvents include alcohols such as methanol, ethanol, 1-propanol, 2-propanol, sec-butanol, tert-butanol and cyclohexyl alcohol; polyhydric alcohols such as ethylene glycol, propylene glycol and glycerol; and tetrahydrofuran, dioxane, dimethylformamide, dimethyl sulfoxide, dimethylacetamide, formamide, ethylene chlorohydrin, etc. These water-miscible organic solvents may be used alone or in admixture of two or more. Among them, ethanol and dimethyl sulfoxide are preferred because of their good dissolving power for the ethylene-vinyl acetate copolymer or its saponification product and their low toxicity.

Most preferably, a mixture of a water-miscible organic solvent and water is used as the solvent for the following reason. The saponification product is composed of ethylene units that are nonpolar and hydrophobic, and vinyl alcohol and vinyl acetate units that are polar and hydrophilic. As a result, it is believed that, when the saponification product is dissolved in a highly polar solvent system and the resulting solution is applied to a nonpolar matrix surface (e.g., a pore surface comprising a crosslinked copolymer or a polyolefin), nonpolar ethylene units tend to be localized in that surface of the resulting thin layer of the saponification product which contacts the nonpolar matrix surface, and polar vinyl alcohol and vinyl acetate units tend to be localized in the opposite surface facing the pore space. This phenomenon is desirable because the adhesion of the saponification product thin layer to the heat-resisting porous membrane is improved and, moreover, the hydrophilicity of the surface of the saponification product thin layer held on the pore surfaces of the heat-resisting porous membrane is also improved. Accordingly, it is preferable to use a mixture of a water-miscible organic solvent and water as the solvent for the holding solution, in that the polarity of the solvent is enhanced to manifest the above-described phenomenon more pronouncedly. Where a mixture of a water-miscible solvent and water is used, the proportion of water contained in the mixture should preferably be maximized so long as the dissolution of the saponification product is not hindered and the penetration of the resulting solution into the porous membrane is not hindered. Although the proportion of water may vary according to the concentration of the saponification product, its content of ethylene units, its degree of saponification, the treating temperature and the like, the preferred range is from 5 to 60% by weight.

The concentration of the saponification product in the holding solution should be high enough to produce the desired hydrophilizing effect and is determined with consideration for the properties of the heat-resisting porous membrane serving as the matrix. Generally, it is preferable that the concentration of the saponification product be within the range of about 0.1 to 5% by weight.

In holding of the saponification product on the heat-resisting porous membrane, the soaking or other treatment may be completed in a single operation, or carried out in several steps by using a holding solution containing the saponification product at a relatively low concentration. If the concentration of the saponification product in the holding solution is greater than 5% by weight, the amount of saponification product deposited is so great that it may reduce the pore diameter of the porous membrane serving as the matrix and detract from the liquid permeation performance thereof. Although the amount of saponification product held may be suitably determined with consideration for the performance to be imparted to heat-resisting porous membrane, it is generally within the range of 1 to 20% by weight, preferably 2 to 15% by weight, based on the weight of the porous membrane prior to holding the crosslinked copolymer.

No particular limitation is placed on the temperature of the holding solution. However, higher temperatures are preferred so long as the matrix and the saponification product are not damaged and the solvent does not evaporate to a considerable degree. This is because higher temperatures facilitate the dissolution of the saponification product and reduce the viscosity of the resulting solution. For example, it is preferable to employ a temperature ranging from room temperature to 100° C. In the case of soaking treatment, the soaking time preferably ranges from several seconds to several tens of minutes. In order to remove the solvent from the holding solution held in the pores of the heat-resisting porous membrane, there may be employed such techniques as vacuum drying and hot air drying. The drying may be carried out at a temperature at which the matrix does not undergo thermal deformation, and it is preferable to employ a temperature of 100° C. or below.

Where a solution of an ethylene-vinyl acetate copolymer is used, a hydrophilized heat-resisting porous membrane in accordance with the present invention can be obtained by subjecting a heat-resisting porous membrane to a series of operations including impregnation with the solution, removal of excess solution, drying, saponification, washing and drying. More specifically, the ethylene-vinyl acetate copolymer is held in the same manner as described above for the direct holding of the saponification product. The content of ethylene units in the ethylene-vinyl acetate copolymer should be within the same range as described above for the content of ethylene units in the saponification product. As the solvent for the ethylene-vinyl acetate copolymer, there may be used any of the previously described solvents for the dissolution of the saponification product. The concentration of the ethylene-vinyl acetate copolymer in its solution is preferably within the range of 0.1.to 5% by weight. The impregnation or other treatment for holding of the ethylene-vinyl acetate copolymer may be completed in a single operation, or carried out in several steps by using a solution having a relatively low concentration. Where this treatment is to be completed in a single operation, a solution having a copolymer concentration of greater than 1.0% by weight should preferably be used so that sufficient hydrophilicity may be obtained after saponification treatment. If the copolymer concentration is greater than 5% by weight, the ethylene-vinyl acetate copolymer tends to reduce the pore diameter of the porous membrane serving as the matrix and detract from the liquid permeation performance thereof.

The ethylene-vinyl acetate copolymer held on the heat-resisting porous membrane can be saponified by immersing the heat-resisting porous membrane having the ethylene-vinyl acetate copolymer held thereon in an aqueous solution of an alkali such as sodium hydroxide and heat-treating it for a sufficient period of time. This saponification treatment may be carried out until a degree of saponification of not less than 60 mole % is attained.

The above-described treatment steps may be carried out in a batch or continuous process.

The present invention is further illustrated by the following examples. In these examples, porous membranes obtained by melt forming and subsequent stretching and having a pore structure in which slit-like spacings (pores) formed by microfibrils and joint portions communicated three-dimensionally with each other were used.

EXAMPLE 1

A porous hollow fiber membrane (EHF410CB; a product of Mitsubishi Rayon Co., Ltd.) formed of polyethylene and having an inner diameter of 270 μm, a membrane thickness of 79 μm, a porosity of 63%, a bubble point of 3.8 kg/cm$^2$ and a water permeability of 1.5 l/m$^2$·hr·mmHg was fed through a monomer solution at a speed of 1 m/min and thereby soaked therein for about 20 seconds. The monomer solution was composed of 7 parts by weight of 1,6-hexanediol dimethacrylate (Acry Ester HX; a product of Mitsubishi Rayon Co., Ltd.), 7 parts by weight of lauryl methacrylate (Acry Ester L: a product of Mitsubishi Rayon Co., Ltd.), 0.14 part by weight of a polymerization initiator (V-70; a product of Wako Pure Chemicals Co., Ltd.) and 86 parts by weight of acetone.

Then, this hollow fiber membrane was allowed to stay in an atmosphere of nitrogen gas at 45° C. for 2 minutes to remove the acetone, and subsequently allowed to stay in an atmosphere of nitrogen gas at 80° C. for 4 minutes to polymerize the monomers. After completion of the polymerization step, the hollow fiber membrane was cleaned by immersing it acetone at 25° C. for 51minutes, and then dried in an atmosphere of nitrogen gas at 80° C. for 2 minutes.

After the resulting heat-resisting hollow fiber membrane having a crosslinked copolymer held on the pore surfaces thereof was hydrophilized with ethanol, the ethanol was replaced by water and the performance of the membrane was evaluated. The results thus obtained are shown in Table 1.

This heat-resisting hollow fiber membrane had a breaking strength of 389 g/fil and an elongation at break of 69% (as measured at a specimen length of 10 cm and a pulling speed of 5 cm/min). After this heat-resisting hollow fiber membrane was immersed in hot water at 90° C. for 1,000 hours, its heat shrinkage was 3.0% or less, its breaking strength was 388 g/fil and its elongation at break was 67% (97% of the initial value).

COMPARATIVE EXAMPLE 1

A heat-resisting porous hollow fiber membrane was produced in the same manner as described in Example 1, except that the monomer solution was composed of 14 parts by weight of 1,6-hexanediol dimethacrylate, 0.14 part by weight of a polymerization initiator (V-70) and 86 parts by weight of acetone. After the resulting heat-resisting hollow fiber membrane was hydrophilized with ethanol, the ethanol was replaced by water and the performance of the membrane was evaluated. The results thus obtained are shown in Table 1.

COMPARATIVE EXAMPLE 2

The porous hollow fiber membrane (EHF410CB) used as the matrix in Example 1 was tested in the untreated state. After this hollow fiber membrane was hydrophilized with ethanol, the ethanol was replaced by water and the performance of the membrane was evaluated. The results thus obtained are shown in Table 1.

EXAMPLE 2

The heat-resisting hollow fiber membrane obtained in Example 1 and having a crosslinked copolymer held on the pore surfaces thereof was fed through a coating solution at a speed of 1 m/min. so as to provide a soaking time of 20 seconds. The coating solution was composed of 2.0 parts by weight of a saponification product of an ethylene-vinyl acetate copolymer (Soanol A4412; a product of Japan Synthetic Chemical Industries Co., Ltd.; degree of saponification, 98% or greater; ethylene content, 44 mole 75 parts by weight of ethanol and 25 parts by weight of water. Then, the hollow fiber membrane was taken out into an atmosphere at 60° C., allowed to stay therein for 4 minutes, and subsequently dried in an atmosphere at 50° C.

The hollow fiber membrane thus obtained had the performance shown in Table 1. When this hollow fiber membrane was immersed in the No. 54 standard solution for wetting index tests (with a surface tension of 54 dyn/cm) described in JIS K6768 for 2 seconds or more and its colored state was observed with the naked eye, the whole membrane was found to be almost uniformly dyed blue to the interior of the pores. This confirmed that the hydrophilicity of the pore surfaces of the hollow fiber membrane was enhanced to a surface tension of 54 dyn/cm or greater.

This hydrophilized heat-resisting hollow fiber membrane had a breaking strength of 402 g/fil and an elongation at break of 72% (as measured at a specimen length of 10 cm and a pulling rate of 5 cm/min). After this hydrophilized heat-resisting hollow fiber membrane was immersed in hot water at 90° C. for 1,000 hours, its breaking strength was 399 g/fil and its elongation at break was 70.5% (98% of the initial value).

COMPARATIVE EXAMPLE 3

The heat-resisting porous hollow fiber membrane obtained in Comparative Example 1 was treated in the same manner as described in Example 2 to obtain a hydrophilized heat-resisting porous hollow fiber membrane. This hollow fiber membrane had the performance shown in Table 1. When it was immersed in hot water at 90° C. for 1,000 hours, its elongation at break showed a marked reduction.

EXAMPLE 3

A heat-resisting porous hollow fiber membrane was produced in the same manner as described in Example 1, except that the monomer solution was composed of 7 parts by weight of trimethylolpropane trimethacrylate (Acry Ester TMP; a product of Mitsubishi Rayon Co., Ltd.), 7 parts by weight of stearyl methacrylate (Acry Ester S; a product of Mitsubishi Rayon Co., Ltd.), 0.14 part by weight of a polymerization initiator (V-70) and 86 parts by weight of acetone. Then, this hollow fiber membrane was treated in the same manner as described in Example 2 to obtain a hydrophilized heat-resisting porous hollow fiber membrane. This hollow fiber membrane had the performance shown in Table 1. When it was immersed in hot water at 90° C. for 1,000 hours, its elongation at break remained almost unchanged.

COMPARATIVE EXAMPLE 4

A hydrophilized heat-resisting porous hollow fiber membrane was produced in the same manner as described in Examples 1 and 2, except that the monomer solution was composed of 14 parts by weight of trimethylolpropane trimethacrylate, 0.14 part by weight of a polymerization initiator (V-70) and 86 parts by weight of acetone. This hollow fiber membrane had the performance shown in Table 1. When it was immersed in hot water at 90° C. for 1,000 hours, its elongation at break showed a marked reduction.

EXAMPLE 4

A hydrophilized heat-resisting porous hollow fiber membrane was produced in the same manner as described in Examples 1 and 2, except that the monomer solution was composed of 8 parts by weight of 1,3-butylene glycol dimethacrylate (Acry Ester BD; a product of Mitsubishi Rayon Co., Ltd.), 6 parts by weight of tridecyl methacrylate (Acry Ester TD; a product of Mitsubishi Rayon Co., Ltd.), 0.14 part by weight of a polymerization initiator (V-70) and 86 parts by weight of acetone. This hollow fiber membrane had the performance shown in Table 1.

COMPARATIVE EXAMPLE 5

A hydrophilized heat-resisting porous hollow fiber membrane was produced in the same manner as described in Examples 1 and 2, except that the monomer solution was composed of 14 parts by weight of tridecyl methacrylate (Acry Ester TD), 0.14 part by weight of a polymerization initiator (V-70) and 86 parts by weight of acetone. This hollow fiber membrane had the performance shown in Table 1. Since the monomer solution contained no crosslinkable monomer, the hollow fiber membrane underwent marked heat deformation in hot water.

EXAMPLE 5

A hydrophilized heat-resisting porous hollow fiber membrane was produced in the same manner as described in Examples 1 and 2, except that the monomer solution was composed of 7 parts by weight of 1,6-hexanediol dimethacrylate (Acry Ester HX), 7 parts by weight of a mixture of lauryl methacrylate and tridecyl methacrylate (Acry Ester SL; a product of Mitsubishi Rayon Co., Ltd.), 0.14 part by weight of a polymerization initiator (V-70) and 86 parts by weight of acetone. This hollow fiber membrane had the performance shown in Table 1.

EXAMPLE 6

An ethylene-vinyl acetate copolymer (with an ethylene content of 35 mol %) and sodium hydroxide in an amount equimolar to that of the vinyl acetate component were added to a solvent mixture of methanol and toluene (in a volume ratio of 1:2). The resulting mixture was stirred at 65° C. to effect partial saponification and thereby obtain an ethylene-vinyl acetate-vinyl alcohol copolymer (in a molar ratio of 35:15:50).

Two parts by weight of this partially saponified copolymer was dissolved in a mixture composed of 75 parts by weight of ethanol and 25 parts by weight of water to prepare a coating solution. A heat-resisting hollow fiber membrane having a crosslinked copolymer held thereon, which was obtained in the course of Example 5, was soaked in the coating solution for 20 seconds. Then, the hollow fiber membrane was taken out into an atmosphere at 60° C., allowed to stay therein for 4 minutes, and subsequently dried in an atmosphere at 50° C. The hollow fiber membrane thus obtained had the performance shown in Table 1.

EXAMPLE 7

A hydrophilized heat-resisting porous hollow fiber membrane was produced in the same manner as described in Examples 1 and 2, except that the monomer solution was composed of 7 parts by weight of 1,6-hexanediol dimethacrylate (Acry Ester HX; a product of Mitsubishi Rayon Co., Ltd.), 7 parts by weight of benzyl methacrylate (Acry Ester BZ; a product of Mitsubishi Rayon Co., Ltd.), 0.14 part by weight of a polymerization initiator (V-70) and 86 parts by weight of acetone. This hollow fiber membrane had the performance shown in Table 1.

TABLE 1

| Example No. | Amount of heat-resisting crosslinked copolymer held (wt. %)[1] | Amount of hydrophilic polymer (wt. %)[1] | Water flux (l/m² · hr · mmHg) | Dyeability with No. 54 standard solution for wetting index tests | Shrinkage after immersion in hot water at 90° C. for 1,000 hours (%) | Change in elongation break after immersion in hot water at 90° C. for 1,000 hours (%)[2] |
|---|---|---|---|---|---|---|
| Example 1 | 26.8 | — | 1.5 | Not dyed | 3.0 or less | 97 |
| Example 2 | 26.8 | 7.6 | 1.5 | Good | 3.0 or less | 98 |
| Example 3 | 27.8 | 7.7 | 1.5 | Good | 3.0 or less | 102 |
| Example 4 | 27.0 | 7.6 | 1.45 | Good | 3.0 or less | 97 |
| Example 5 | 25.4 | 7.5 | 1.5 | Good | 3.0 or less | 98 |
| Example 6 | 25.4 | 7.0 | 1.5 | Good | 3.0 or less | 99 |
| Example 7 | 24.8 | 7.9 | 1.5 | Good | 3.0 or less | 97 |
| Comparative Example 1 | 26.0 | — | 1.5 | Not dyed | 3.0 or less | 46 |
| Comparative Example 2 | — | — | 1.5 | Not dyed | 15.0 | 124 |
| Comparative Example 3 | 26.0 | 7.8 | 1.5 | Good | 3.0 or less | 54 |
| Comparative Example 4 | 28.0 | 7.7 | 1.55 | Good | 3.0 or less | 23 |
| Comparative Example 5 | 25.4 | 7.8 | 1.45 | Good | 13.5 | 123 |

[1] Based on the porous membrane used as the matrix.
[2] Percentage of each measured value as compared with the initial value.

The hydrophilized heat-resisting porous membranes of the present invention have hydrophilicity and heat resistance which is characterized in that their physical properties are not changed even after they are immersed in hot water for a long period of time. Thus, the present invention makes it possible to use porous membranes formed of polyolefins in fields of application requiring sterilization with hot water (such as medical treatment, food industry and fermentation industry) and fields of application involving the treatment of hot water (such as purification of polysaccharides and treatment of condensate from power plants).

What is claimed is:

1. A heat-resisting porous membrane comprising a porous polyolefin membrane having a crosslinked copolymer held on at least a part of the pore surfaces thereof, the crosslinked copolymer being composed of a monomer (A) comprising at least one multifunctional (meth)acrylate and a monomer (B) comprising at least one monofunctional (meth)acrylate whose ester forming part consists of a hydrocarbon radical of 5 to 18 carbon atoms.

2. A heat-resisting porous membrane as claimed in claim 1 wherein the hydrocarbon radical of 5 to 19 carbon atoms is selected from the class consisting of alkyl groups of 5 to 18 carbon atoms, aralkyl groups of 7 to 20 carbon atoms, and aryl groups of 6 to 20 carbon atoms.

3. A heat-resisting porous membrane as claimed in claim 2 wherein the hydrocarbon radical of 5 to 18 carbon atoms is selected from the class consisting of alkyl groups of 5 to 18 carbon atoms and aralkyl groups of 7 to 18 carbon atoms.

4. A heat-resisting porous membrane as claimed in claim 1 wherein the multifunctional (meth)acrylate is multifunctional methacrylate.

5. A hydrophilized heat-resisting porous membrane comprising a porous polyolefin membrane having a cross-linked copolymer held on at least a part of the pore surfaces thereof and additionally having a hydrophilic polymer held on at least a part of the crosslinked copolymer, the crosslinked copolymer being composed of a monomer (A) comprising at least one multifunctional (meth)acrylate and a monomer (B) comprising at least one monofunctional (meth)acrylate whose ester forming part consists of a hydrocarbon radical of 5 to 18 carbon atoms.

6. A hydrophilized heat-resisting porous membrane as claimed in claim 5 wherein the hydrophilic polymer is a saponification product of an ethylene-vinyl acetate copolymer.

7. A hydrophilized heat-resisting porous membrane as claimed in claim 5 wherein the hydrocarbon radical of 5 to 18 carbon atoms is selected from the class consisting of alkyl groups of 5 to 18 carbon atoms, aralkyl groups of 7 to 18 carbon atoms, and aryl groups of 6 to 18 carbon atoms.

8. A hydrophilized heat-resisting porous membrane as claimed in claim 7 wherein the hydrocarbon radical of 5 to 18 carbon atoms is selected from the class consisting of alkyl groups of 5 to 18 carbon atoms and aralkyl groups of 7 to 18 carbon atoms.

9. A hydrophilized heat-resisting porous membrane as claimed in claim 5 wherein the multifunctional (meth)acrylate is multifunctional methacrylate.

* * * * *